(12) United States Patent
Nishimura et al.

(10) Patent No.: US 7,388,346 B2
(45) Date of Patent: Jun. 17, 2008

(54) ADJUSTMENT METHOD OF ROTOR POSITION DETECTION OF SYNCHRONOUS MOTOR

(75) Inventors: Shinji Nishimura, Tokyo (JP); Yoshinobu Utsumi, Tokyo (JP); Yoshihito Asao, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 18 days.

(21) Appl. No.: 10/543,212

(22) PCT Filed: Jan. 27, 2005

(86) PCT No.: PCT/JP2005/001123

§ 371 (c)(1),
(2), (4) Date: Jul. 22, 2005

(87) PCT Pub. No.: WO2005/074117

PCT Pub. Date: Aug. 11, 2005

(65) Prior Publication Data

US 2006/0113949 A1 Jun. 1, 2006

(30) Foreign Application Priority Data

Jan. 30, 2004 (JP) ............................. 2004-024152

(51) Int. Cl.
*H02P 1/46* (2006.01)
*H02P 1/50* (2006.01)
*H02P 3/18* (2006.01)
*H02P 6/00* (2006.01)
*H02P 23/00* (2006.01)

(52) U.S. Cl. .................. 318/723; 318/700; 318/432; 318/434

(58) Field of Classification Search .................. None
See application file for complete search history.

(56) References Cited

U.S. PATENT DOCUMENTS 6,657,413 B2 * 12/2003 Nakatsugawa et al. ...... 318/700
2004/0027015 A1   2/2004 Utsumi et al.

(Continued)

FOREIGN PATENT DOCUMENTS

JP           6-165561 A      6/1994

(Continued)

*Primary Examiner*—Lincoln Donovan
*Assistant Examiner*—Erick Glass
(74) *Attorney, Agent, or Firm*—Sughrue Mion, PLLC

(57) ABSTRACT

To obtain an adjustment method of rotor position detection of a synchronous motor with excellent productivity. An adjustment method of rotor position detection of a synchronous motor, wherein a synchronous motor having a stator wound around a stator coil and a rotor provided with magnetic poles, and a rotational position detector having a sensor rotor fixed to the rotor and a sensor stator disposed opposite to the sensor rotor for detecting a rotational position of the rotor are provided, and wherein an amount of deviation between the rotational position of the synchronous motor determined from an output of the rotational position detector and an actual rotational position of the synchronous motor is adjusted, the method comprising: a step of detecting the amount of deviation during rotation of the synchronous motor; and a step of mechanically adjusting a relative position between the rotational position detector and the synchronous motor based on a detected value of the amount of deviation, is provided.

9 Claims, 5 Drawing Sheets

U.S. PATENT DOCUMENTS

2004/0061461 A1*   4/2004   Tajima et al. ............... 318/254
2005/0104551 A1    5/2005   Nishimura et al.

FOREIGN PATENT DOCUMENTS

| JP | 10-94299 A     | 4/1998  |
| JP | 2004-72894 A   | 3/2001  |
| JP | 2001-309694 A  | 11/2001 |
| JP | 2003-32989 A   | 1/2003  |
| JP | 2004-266935 A  | 9/2004  |

* cited by examiner

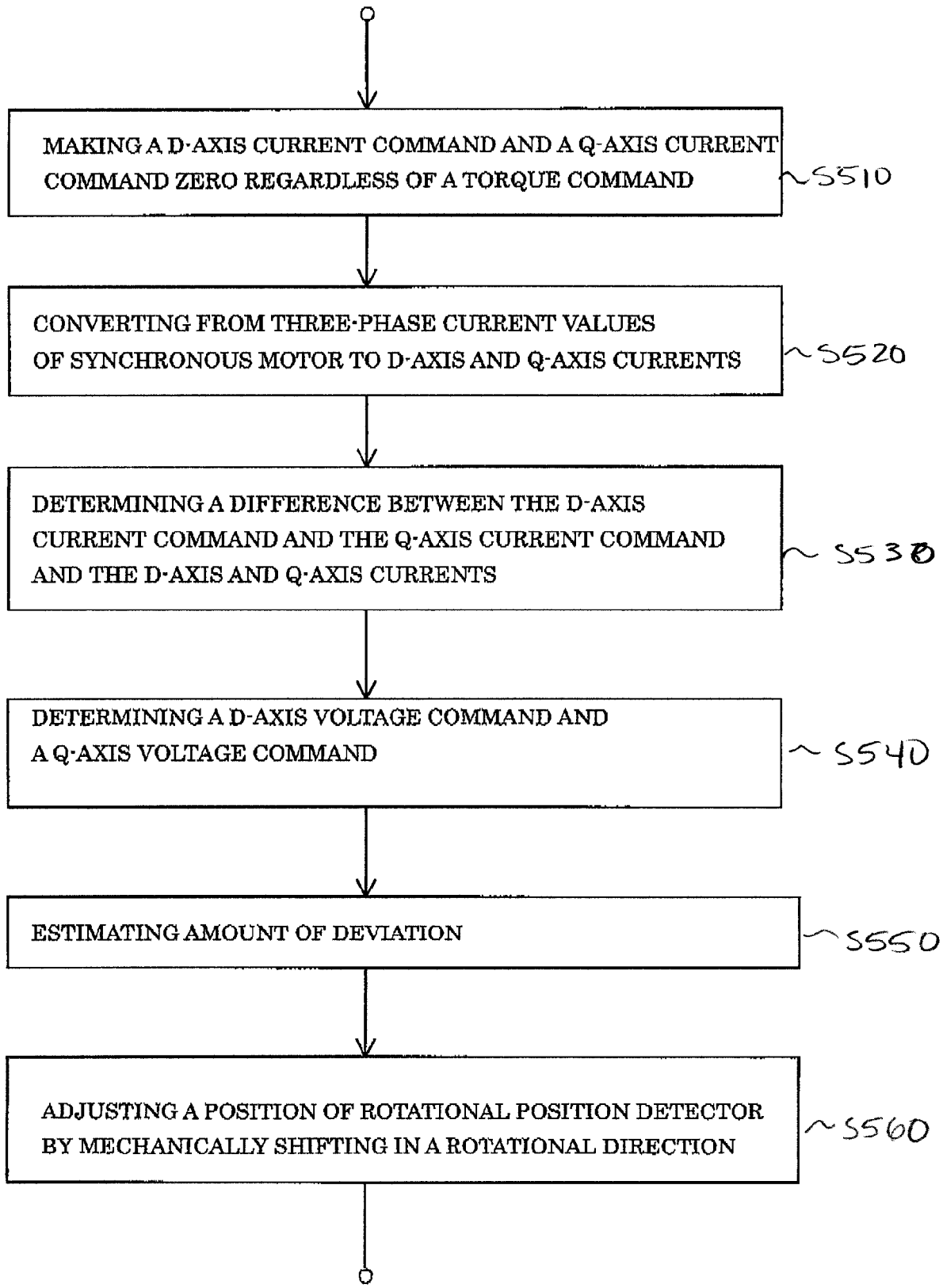

ADJUSTMENT METHOD OF ROTOR POSITION DETECTION OF SYNCHRONOUS MOTOR

TECHNICAL FIELD

The present invention relates to an adjustment method of rotor position detection of a synchronous motor and, more particularly, concerns a position adjustment method of a rotational position detector.

BACKGROUND ART

A conventional method of correcting a deviation generated between a rotational position of a synchronous motor determined from an output of a rotational position detector and an actual rotational position of the synchronous motor includes: a step of detecting a no-load state of the motor with a no-load detector; a step of detecting a motor voltage applied to a winding of the motor with a motor voltage detector; a step of computing d-axis and q-axis voltages from rotation angle information of the rotational position detector and the motor voltage; and a step of correcting the rotation angle so that the d-axis voltage becomes zero (see, for example, Patent Document 1).

In the above described conventional method of correcting the deviation generated between the rotational position of a synchronous motor determined from the output of the rotational position detector and the actual rotational position of the synchronous motor, since a motor voltage detector and a no-load detector must be provided, an apparatus adopting this method becomes expensive.

Patent Document 1: Japanese Unexamined Patent Application Publication No. 6-165561

DISCLOSURE OF THE INVENTION

Problem to be Solved by the Invention

An object of the present invention is to obtain a synchronous motor with good performance by stabilizing and improving the positioning accuracy of a rotational position detector and to obtain an adjustment method of rotor position detection of a synchronous motor with excellent productivity.

Further, an object of the present invention is to obtain an adjustment method of rotor position detection of a synchronous motor which eliminates a no-load detector and a motor voltage detector and which can precisely correct a deviation of a rotational position of a rotational position detector.

Means for Solving the Problem

The present invention provides an adjustment method of rotor position detection of a synchronous motor, wherein a synchronous motor having a stator wound around a stator coil and a rotor provided with magnetic poles, and a rotational position detector having a sensor rotor fixed to the rotor and a sensor stator disposed opposite to the sensor rotor for detecting a rotational position of the rotor are provided, and wherein an amount of deviation between the rotational position of the synchronous motor determined from an output of the rotational position detector and an actual rotational position of the synchronous motor is adjusted, the method comprising: a step of detecting the amount of deviation during rotation of the synchronous motor; and a step of mechanically adjusting a relative position between the rotational position detector and the synchronous motor based on a detected value of the amount of deviation.

Further, the present invention provides an adjustment method of rotor position detection of a synchronous motor, wherein an amount of deviation between a rotational position of the synchronous motor determined from an output of a rotational position detector of the synchronous motor, on which vector control is performed, and an actual rotational position of the synchronous motor is adjusted, the method comprising: a step of making a d-axis current command and a q-axis current command zero regardless of a torque command based on a phase correction command for commanding adjustment for a rotational position deviation; a step of converting from three-phase current values of the synchronous motor to d-axis and q-axis currents; a step of determining a difference between the d-axis current command and the q-axis current command and the d-axis and q-axis currents; a step of determining a d-axis voltage command and a q-axis voltage command based on the difference; a step of estimating the amount of deviation based on the d-axis voltage command and the q-axis voltage command; and a step of adjusting a position of the rotational position detector based on the estimated amount of deviation by mechanically shifting in a rotational direction.

Furthermore, the present invention also provides an adjustment method of rotor position detection of a synchronous motor, wherein an amount of deviation between a rotational position of the synchronous motor determined from an output of a rotational position detector of the synchronous motor, on which vector control is performed, and an actual rotational position of the synchronous motor is adjusted, the method comprising: a step of making a d-axis current command and a q-axis current command zero regardless of a torque command based on a phase correction command for commanding adjustment for a rotational position deviation; a step of converting from three-phase current values of the synchronous motor to d-axis and q-axis currents; a step of determining a difference between the d-axis current command and the q-axis current command and the d-axis and q-axis currents; a step of determining a d-axis voltage command and a q-axis voltage command based on the difference; a step of estimating the amount of deviation by determining the amount of offset in which the d-axis voltage command becomes zero; and a step of adjusting a position of the rotational position detector based on the estimated amount of deviation by mechanically shifting in a rotational direction.

Effects of the Invention

According to the adjustment method of rotor position detection of a synchronous motor of the present invention, it can obtain a synchronous motor with good performance by stabilizing and improving positioning accuracy of a rotational position detector and to obtain an adjustment method of rotor position detection of a synchronous motor with excellent productivity. In particular, since the amount of deviation is detected while rotating, an average value of the amount of deviation can be obtained and the detection accuracy of the amount of deviation can be improved. Further, as seen from an earlier application to be described later, the method can be simplified by eliminating extra work, such as when DC energization is applied to a stator to constrain a rotor.

Further, a no-load detector and a motor voltage detector are not required and a deviation of a rotational position of a rotational position detector can be corrected.

BEST MODE FOR CARRYING OUT THE INVENTION

Japanese Patent Application No. 2002-228531 entitled "Rotating Electric Machine and Method and Apparatus for Positioning Rotational Position Sensor Therefor" is an earlier application by the same applicant as the present invention. In this case, position adjustment is performed by a system in which a direct current is supplied to a stator to constrain a rotor. When constraining the rotor, the adjustment is required by determining an average value after adjusting a predetermined numbers of times due to the presence of variations at the rotor-constrained positions depending on the number of poles. Further, since there is no moving area, due to mechanical friction, even though the rotor is constrained, extra work is required to constrain the rotor by supplying a direct current after moving the rotor to a position slightly deviated from the constrained position of the rotor to enhance accuracy while constraining the rotor. In addition, energy for energizing the rotor is required in the case of a winding field type rotor.

The present invention has an object to obtain an adjustment method of rotor position detection of a synchronous motor with superior productivity than the above-mentioned earlier application.

Embodiment 1

FIG. 1 is a block diagram of a motor apparatus for explaining an adjustment method of rotor position detection of a synchronous motor of Embodiment 1 according to the present invention. A synchronous motor apparatus includes a synchronous motor 1 having a permanent magnet field or winding field and a controller for controlling the synchronous motor 1. The controller includes a resolver 2, which is a rotational position detector, for detecting a rotor position of the synchronous motor 1; a phase computing unit 3 for computing a rotor position angle θ from an output of the resolver 2; a current detector 4 for detecting three-phase currents Iu, Iv, and Iw of the synchronous motor 1; and a three-phase to two-phase converter 5 for converting the rotor position angle θ and the three-phase currents Iu, Iv, and Iw to d-axis and q-axis currents (actual current).

Further, the controller includes an angular velocity computing unit 6 for determining the rotational angular velocity ω of the synchronous motor 1 from the output of the resolver 2; a current command generator 7 for generating a d-axis current command Id* and a q-axis current command Iq* from a torque command T* and a rotational angular velocity ω; a current controller 8 for determining a d-axis voltage command Vd* and a q-axis voltage command Vq* from an error Δεd between the d-axis current command Id* and the d-axis current Id and an error Δεq between the q-axis current command Iq* and the q-axis current Iq; a voltage converter 9 for determining three-phase voltage commands Vu*, Vv*, and Vw* from the d-axis voltage command Vd* and the q-axis voltage command Vq* and the rotor position angle θ; an inverter 10 for converting electric power of a direct current power supply (not shown in the figure) to three-phase alternating current electric power based on the three-phase voltage commands Vu*, Vv*, and Vw* and energizing the synchronous motor 1; and a phase correction amount detector 11 for detecting an amount of deviation (an amount of correction) generated between a rotational position of the synchronous motor 1 determined from an output of the resolver 2 by inputting the d-axis voltage command Vd* and the q-axis voltage command Vq* and an actual rotational position of the synchronous motor 1. Further, when having a field winding, the synchronous motor 1 includes a field drive section (not shown in the figure) for exciting the field winding.

Since the controller of this synchronous motor is the same as the controller configuration adopting vector control in the conventional synchronous motor or a permanent magnet field synchronous motor (DC brushless motor), except the phase correction amount detector 11, the operation of similar portion will be described briefly.

The phase computing unit 3 determines the rotor position angle θ of the synchronous motor 1 from the output of the resolver 2, which is the rotational position detector. Further, the angular velocity computing unit 6 determines the rotational angular velocity ω by using the output of the resolver 2. This rotational angular velocity ω and the torque command T* are inputted to the current command generator 7, and the d-axis current command Id* and the q-axis current command Iq* are determined so that the torque T at the rotational angular velocity ω becomes a torque command value T*. On the other hand, the current detector 4 detects the three-phase currents Iu, Iv, and Iw flowing in the synchronous motor 1, and the d-axis current Id and the q-axis current Iq are determined from the rotor position angle θ and the three-phase currents Iu, Iv, and Iw by the three-phase to two-phase converter 5.

The current controller 8 determines the d-axis voltage command Vd* and the q-axis voltage command Vq* by performing proportional plus integral control (so-called PI control) by which the error Δεd between the d-axis current command Id* and the d-axis current Id and the error Δεq between the q-axis current command Iq* and the q-axis current Iq are controlled and by further performing decoupling control in which terms that interfere with each other are subtracted. In addition, the voltage converter 9 determines the three-phase voltage commands Vu*, Vv*, and Vw* based on these voltage commands Vd* and Vq* and the rotor position angle θ. The inverter 10 performs current output control based on the three-phase voltage commands Vu*, Vv*, and Vw* to control the rotation velocity of the synchronous motor 1 and torque. Thus, vector control of the synchronous motor 1 is performed. Furthermore, in the case of having a field winding, a field current command If* is inputted to the field drive section to cause a predetermined current to flow in the field winding.

In the above described vector control, if the mounting position of the resolver 2 mounted to the synchronous motor 1 is deviated in the rotational direction, the rotor position angle θ to be determined from the output of the resolver 2 has a deviation generated between it and the actual rotor position of the synchronous motor 1, and conversion to the d-axis and q-axis currents are not correctly performed; therefore, the normal vector control cannot be performed.

Consequently, an adjustment method of rotor position detection of a synchronous motor for correcting a deviation which is concerned with the resolver 2 according to the present invention will be described. When a phase correction command A* is inputted, the current command generator 7 makes the d-axis current command Id* zero and the q-axis current command Iq* zero regardless of the torque command T*. Then, the current controller 8 controls the d-axis voltage command Vd* and the q-axis voltage command Vq* so that Id and Iq, formed by subjecting three-phase currents to three-phase/two-phase conversion, may be zero. The voltage converter 9 and the inverter 10 are operated by the d-axis and q-axis voltage commands so that Id and Iq become zero. At this time, voltage equations at the d-axis and the q-axis of the synchronous motor 1 can be expressed by the following Expressions (1) and (2).

$$Vd = RId - \omega LqIq \quad (1)$$

$$Vq = RIq + \omega LdId + \omega \psi f \quad (2)$$

Here, Vd denotes the d-axis voltage, Vq denotes the q-axis voltage, R denotes a resistance value of one phase, Id denotes the d-axis current, Iq denotes the q-axis current, Ld denotes a d-axis inductance, Lq denotes a q-axis inductance, ω denotes rotational angular velocity, and ψf denotes a magnetic flux in the permanent magnet or the winding field.

In the above Expressions (1) and (2), when it is set that Id=0 and Iq=0, then Vd=0 and Vq=ωψf. But, when there occurs a deviation δ between the rotational position of the synchronous motor 1 determined from the output of the resolver 2 and the actual rotational position of the synchronous motor, Vd and Vq become Vd=ωψf sin dδ and Vq=ωψf cos δ; thus, Vd does not become zero. Therefore, it is required to correct a deviation generated between the rotational position of the synchronous motor 1 determined from the output of the resolver 2 and the actual rotational position of the synchronous motor 1.

The deviation amount δ at this time can be directly determined by using Vd, which is an output of the current controller 8, and the inverse arc tangent (arctangent) of Vq.

That is, the amount of deviation $\delta = \tan^{-1}(Vd/Vq)$ can be outputted as the amount of correction detected value from the phase correction amount detector 11; thus, the amount of deviation δ can be estimated. Based on the amount of deviation δ, the position of the resolver (rotational position detector) is adjusted by mechanically shifting in the rotation direction.

As described, the first embodiment provides an adjustment method of rotor position detection of a synchronous motor, wherein an amount of deviation between a rotational position of the synchronous motor determined from an output of a rotational position detector of the synchronous motor, on which vector control is performed, and an actual rotational position of the synchronous motor is adjusted, the method comprising: a step of making a d-axis current command and a q-axis current command zero regardless of a torque command based on a phase correction command for commanding adjustment for a rotational position deviation (FIG. 5, S510); a step of converting from three-phase current values of the synchronous motor to d-axis and q-axis currents (FIG. 5, S520); a step of determining a difference between the d-axis current command and the q-axis current command and the d-axis and q-axis currents (FIG. 5, S530); a step of determining a d-axis voltage command and a q-axis voltage command based on the difference (FIG. 5, S540); a step of estimating the amount of deviation based on the d-axis voltage command and the q-axis voltage command (FIG. 5, S550); and a step of adjusting a position of the rotational position detector based on the estimated amount of deviation by mechanically shifting in a rotational direction (FIG. 5, S560).

Here, the d-axis voltage Vd and the q-axis voltage command are not required to use voltage detecting means, but the output Vd* and Vq* of the current controller 8 can be used. That is, the amount of deviation of the rotational position detector can be detected and estimated simply by using means for making the d-axis current command and the q-axis current command zero and using the already determined output Vd* and Vq* of the current controller 8 in the conventional synchronous motor apparatus, on which the vector control is performed.

Further, since the amount of deviation is detected while rotating, an average value of the amount of deviation can be detected and detection accuracy of the amount of deviation is improved. Furthermore, extra work, such as when constraining the rotor by supplying DC to the stator, as seen in the earlier application, is eliminated, thereby simplifying the operation and allowing an adjustment method of rotor position detection of a synchronous motor with excellent productivity to be obtained.

The adjustment is performed by mechanically shifting the position of the rotational position detector in the rotational direction based on the estimated amount of deviation; after that, if necessary, the step of measuring the amount of deviation is implemented again and the adjustment is completed without shifting to mechanical adjustment of the rotational position detector when the obtained amount of deviation is smaller than a predetermined value. Further, if the obtained amount of deviation is larger than the predetermined value, the step of measuring the amount of deviation is implemented again, and mechanical adjustment of the rotational position detector may be performed again, thereby performing adjustment more certainly and improving the adjustment accuracy.

Embodiment 2

FIG. 2 is a block diagram for explaining an adjustment method of rotor position detection of a synchronous motor of Embodiment 2 according to the present invention. Referring to the drawings, the same reference numerals as those shown in FIG. 1 of Embodiment 1 represent the same or corresponding elements and elements different from FIG. 1 will be mainly described. A phase correction amount detector 11 inputs a d-axis voltage command Vd* to determine an amount of offset Δθ concerning a rotor position angle θ and outputs it to an adder 32 and also outputs it as an amount of correction detected value. The adder 32 adds the amount of offset Δθ to the rotor position angle θ of a phase computing unit 3.

A method of determining the amount of offset Δθ will be described. In Embodiment 1, the phase correction command for commanding adjustment for a rotational position deviation makes the d-axis current command and the q-axis current command zero regardless of the torque command and determines a difference between these d-axis current command and q-axis current command and the d-axis and q-axis currents; then, the current controller 8 determines the d-axis voltage command and the q-axis voltage command based on the above-mentioned difference. At this time, in FIG. 2, when the d-axis voltage command Vd*, which is the output of the current controller 8, is not zero, the amount of offset Δθ is determined. The amount of offset Δθ is taken as +Δθ when Vd* is positive, and is taken as −Δθ when Vd* is negative. The amount of offset Δθ is determined from an arithmetic progression (1°, 2°, . . . , n°) of the angle in order and is outputted to the adder 32. In this way, Δθ is varied until Vd* becomes zero.

A value which subtracts half of the difference from the amount of offset Δθ when Vd* comes close to zero and the sign of Vd* is reversed is outputted as an amount of offset Δθ. In the case of the above described arithmetic progression, Δθ−0.5° is set as the amount of offset. In this way, Vd* converges to zero. The amount of offset Δθ determined at this time is outputted as an amount of correction detected value. The offset amount Δθ is set as an amount of deviation and based on this amount of deviation, and the position of the resolver (rotational position detector) is mechanically shifted in the rotational direction to adjust it.

As described, the second embodiment provides an adjustment method of rotor position detection of a synchronous motor, wherein an amount of deviation between a rotational position of the synchronous motor determined from an output of a rotational position detector of the synchronous motor, on which vector control is performed, and an actual rotational position of the synchronous motor is adjusted, the method comprising: a step of making a d-axis current command and a q-axis current command zero regardless of a torque command based on a phase correction command for commanding adjustment for a rotational position deviation; a step of converting from three-phase current values of the synchronous motor to d-axis and q-axis currents; a step of determining a difference between the d-axis current command and the q-axis current command and the d-axis and q-axis currents; a step of determining a d-axis voltage command and a q-axis voltage command based on the difference; a step of estimating the amount of deviation by determining the amount of offset in which the d-axis voltage command becomes zero; and a step of adjusting a position of the rotational position detector based on the estimated amount of deviation by mechanically shifting in a rotational direction.

Here, the d-axis voltage Vd is not required to use voltage detecting means, but the output Vd* of the current controller 8 can be used. That is, the amount of deviation of the rotational position detector can be detected and estimated simply by using means for making the d-axis current command and the q-axis current command zero and using the already determined output Vd* of the current controller 8 in the conventional synchronous motor apparatus, on which the vector control is performed.

Further, since the amount of deviation is detected while rotating, an average value of the amount of deviation can be detected and detection accuracy of the amount of deviation is improved. Furthermore, extra work, such as when constraining the rotor by supplying DC to the stator, as seen in the earlier application, is eliminated, thereby simplifying the operation and allowing an adjustment method of rotor position detection of a synchronous motor with excellent productivity to be obtained.

The adjustment is performed by mechanically shifting the position of the rotational position detector in the rotational direction based on the estimated amount of deviation; after that, if necessary, the step of measuring the amount of deviation is implemented again and the adjustment is completed without shifting to mechanical adjustment of the rotational position detector when the obtained amount of deviation is smaller than a predetermined value. Further, if the obtained amount of deviation is larger than the predetermined value, the step of measuring the amount of deviation is implemented again, and mechanical adjustment of the rotational position detector may be performed again, thereby performing adjustment more certainly and improving the adjustment accuracy.

Embodiment 3

Next, an adjustment method of mechanically shifting the position of a rotational position detector in a rotation direction will be described specifically. FIG. 3 is a longitudinal sectional view showing a synchronous motor of Embodiment 3 and FIG. 4 is a front view thereof. In the figures, a synchronous motor is composed of a rotor 12 wound by a field winding 12a, a stator 13 wound by three-phase stator windings 13a, a front bracket 14 and a rear bracket 15 holding the rotor 12 and the stator 13, a rotational position detector 16 for detecting a rotational state of the rotor 12, and the like. The rotor 12 is of a claw pole type.

The rotor 12 includes a rotational shaft 19 rotatably supported by the front bracket 14 and the rear bracket 15 via bearings 17 and 18 on both sides. One end portion of the rotational shaft 19 protrudes from the front bracket 14 and a pulley 20 is fixed on its end portion. Further, two slip rings 21 are assembled on the other end portion of the rotational shaft 19. The rotational position detector 16 disposed outside the rear bracket 15 is coaxially arranged with the rotational shaft 19 on the other side of the rotational shaft 19 to detect the rotational shaft 19, i.e., a magnetic pole position of the rotor 12. Further, inside the rear bracket 15, a brush 22 being in sliding contact with the slip ring 21 is held by a brush holder 22a.

In Embodiment 1 or Embodiment 2, the phase correction amount detector 11 detects and estimates the amount of deviation as an amount of correction detected value. Alternatively, the rotational force of an external load device is transmitted to a belt, coupling, or the like (not shown in the figure) to make the pulley 20, the rotational shaft 19, and the rotor 12 rotate at a constant rotational velocity and the phase correction amount detector 11 detects and estimates the amount of deviation.

After that, the rotation is stopped, the rotor 12 is fixed from outside, and the amount of deviation detected and estimated according to either of the above-mentioned embodiments is adjusted by rotating a sensor stator 16a or a sensor rotor 16b in the rotational direction. An adjustment method of the sensor stator 16a can be easily performed by adjusting the sensor stator 16a with a jig such as a pin inserted into a hole 16c provided at the sensor stator 16a. Further, the adjustment may be performed by grasping a mounting ear 16d. When adjustment is performed by turning the sensor rotor, the adjustment can be performed 360 degrees, and thus the sensor stator of the rotational position detector can be mounted at any position, thereby simplifying the assembly.

As described, mechanical adjustment for adjusting the amount of deviation of the rotational position detector is performed while the synchronous motor is stopped, whereby adjustment work can be done safely, mounting can be simplified, and mounting accuracy can be improved.

Embodiment 4

Further, the sensor stator 16a or the sensor rotor 16b of the rotational position detector 16 may be turned until the output of the rotational position detector 16 becomes a value before correction plus the amount of deviation.

Embodiment 5

In Embodiment 3, rotation is stopped when adjusting the amount of deviation; but, in Embodiment 5, the sensor stator 16a or the sensor rotor 16b may be adjusted so that the amount of deviation becomes zero while monitoring the amount of deviation while turning. As described, a step for detecting the amount of deviation and a mechanical adjustment step of the rotational position detector for adjusting the amount of deviation are performed in parallel, thereby allowing the adjustment time to be shortened.

Embodiment 6

Further, in Embodiment 3, the rotor 12 is rotated by an external load device, but, in Embodiment 6, a stator winding 13*a* is excited by a constant frequency with nothing connected to the rotor 12. Since there is no load, the rotor 12 rotates. After that, a d-axis current command Id* and a q-axis current command Iq* are made zero, and a measuring step of outputs Vd* and Vq* of the current controller 8 is entered. Adjustment is performed by measuring while rotating for a while because of inertia. In this case, a device for driving a synchronous motor from outside is not required, whereby equipment is low cost; and there is no vibration of equipment, thereby improving the detection accuracy.

INDUSTRIAL APPLICABILITY

The present invention is suitable for application to an adjustment method of rotor position detection of a generator motor for use in an internal combustion engine.

BRIEF DESCRIPTION OF THE DRAWINGS

FIG. 1 is a block diagram of a motor apparatus for explaining an adjustment method of rotor position detection of a synchronous motor of Embodiment 1 according to the present invention.

FIG. 2 is a block diagram of a motor apparatus for explaining an adjustment method of rotor position detection of a synchronous motor of Embodiment 2.

FIG. 3 is a longitudinal sectional view showing a synchronous motor of Embodiment 3.

FIG. 4 is a front view of FIG. 3.

[FIG. 5] FIG. 5 is a flowchart showing an adjustment method of rotor position detection of a synchronous motor according to an exemplary embodiment of the present invention.

DESCRIPTION OF REFERENCE NUMERALS IN THE DRAWINGS

Figure 1:
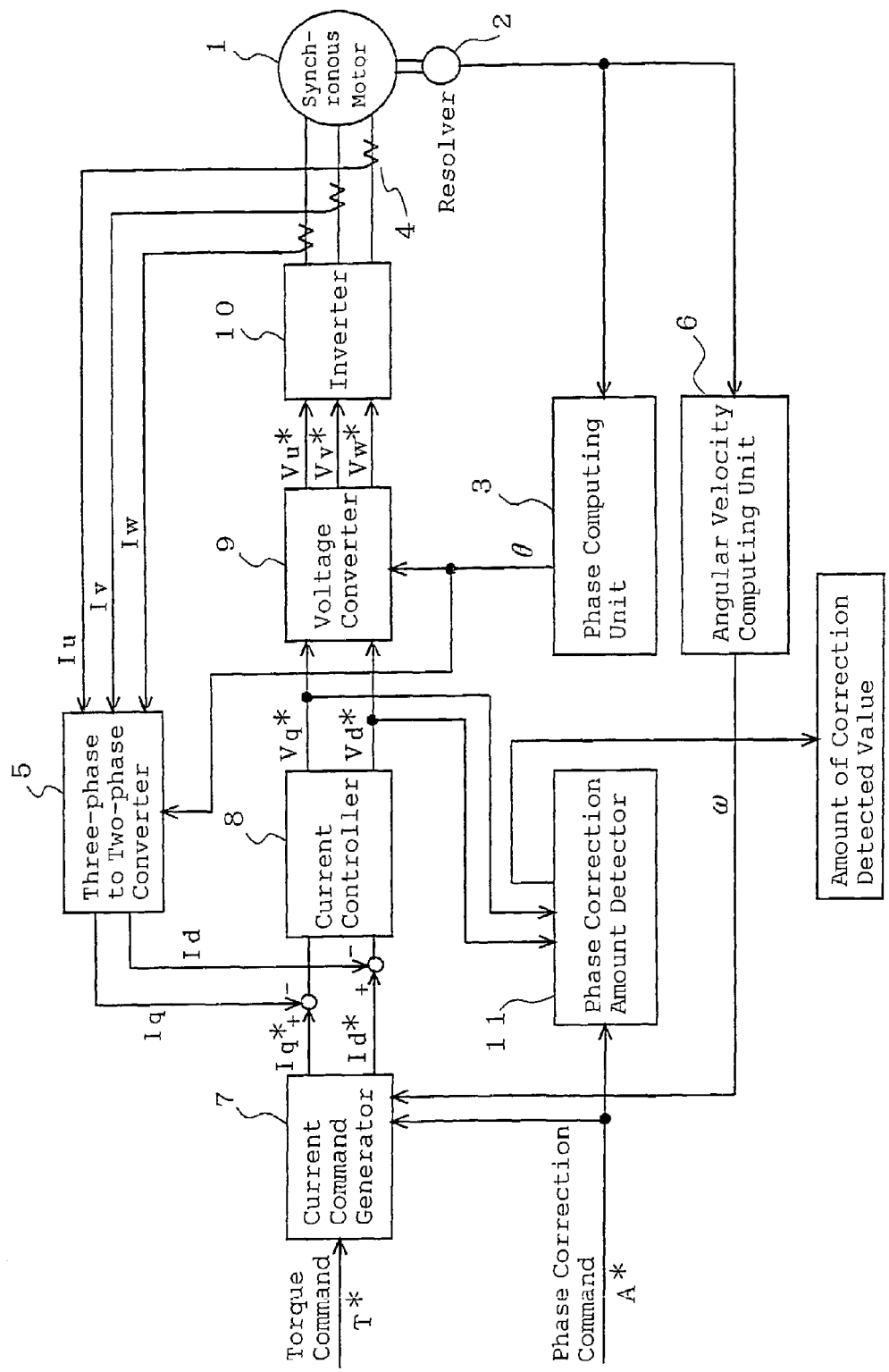
[FIG. 1]
Figure 2:
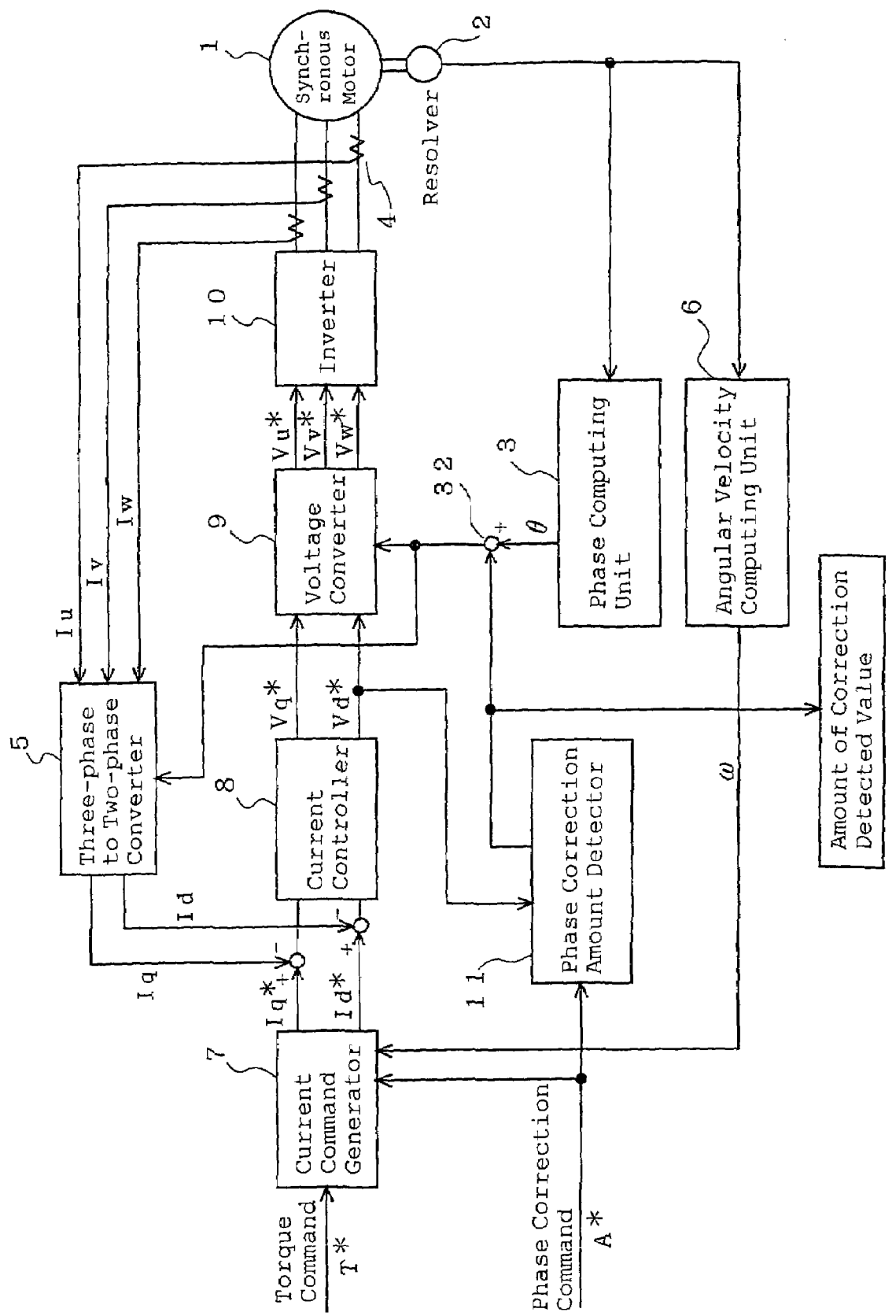
[FIG. 2]
Figure 3:
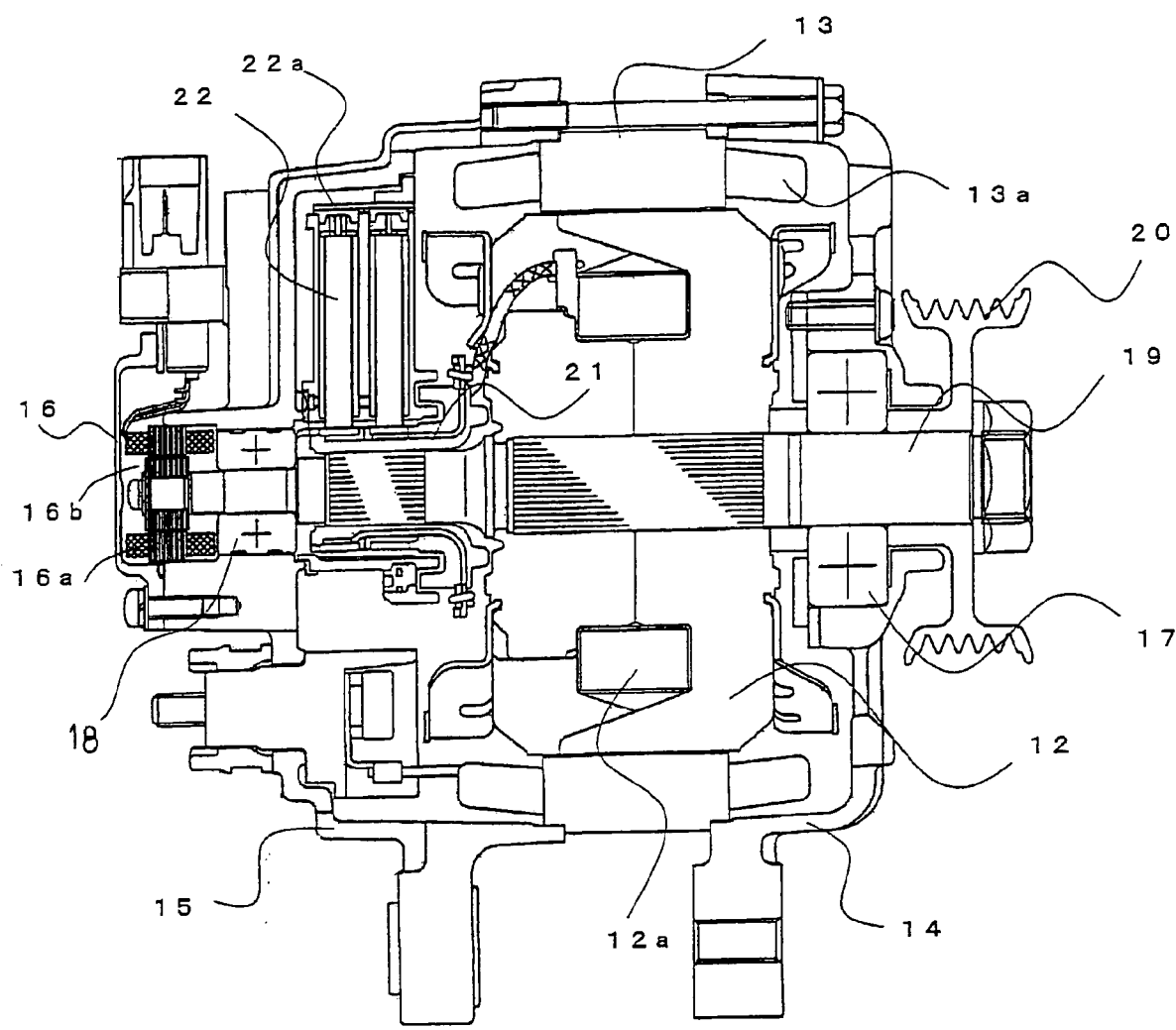
[FIG. 3]
Figure 4:
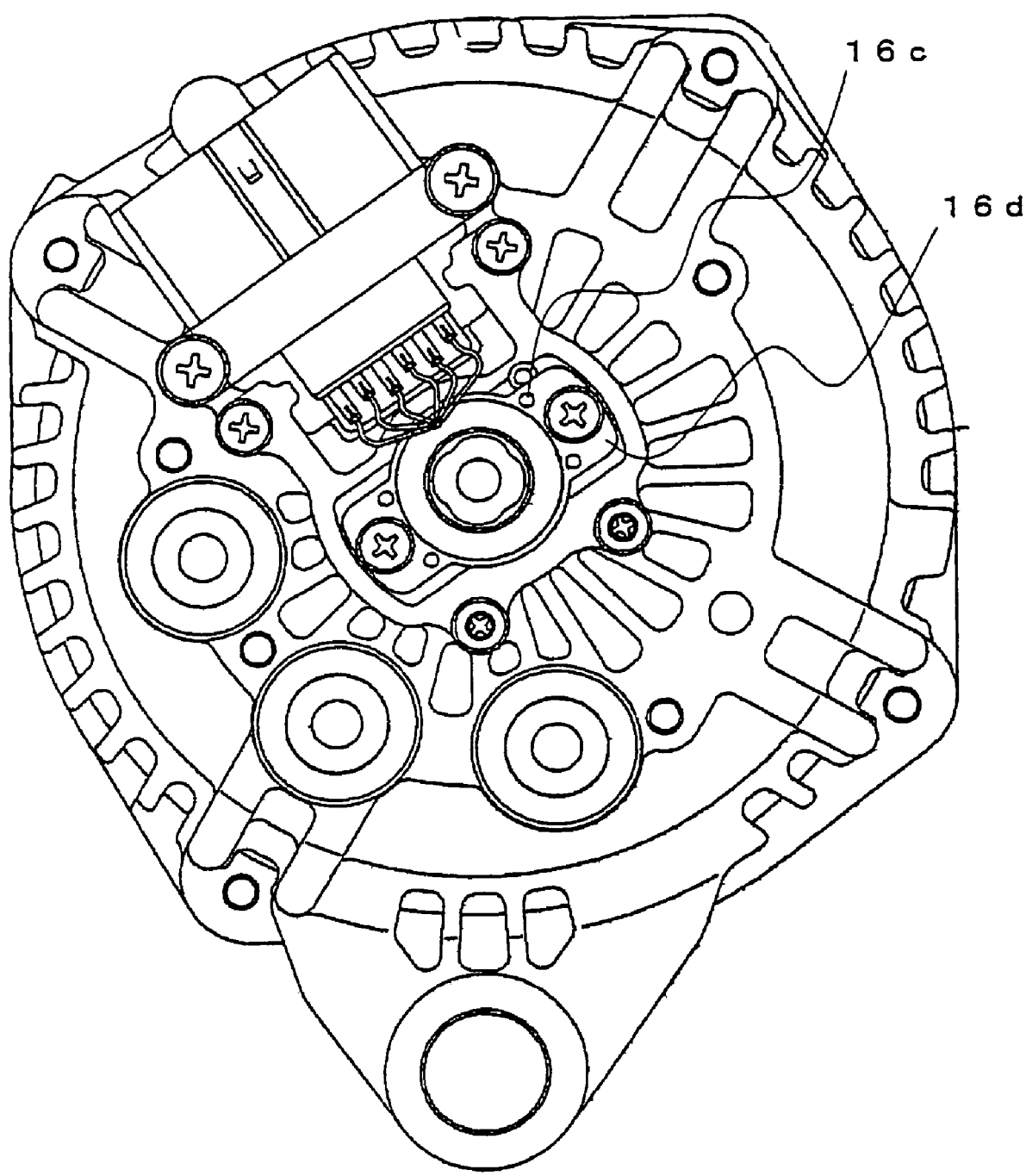
[FIG. 4]

| | |
|---|---|
| 1 | synchronous motor |
| 2 | resolver |
| 3 | phase computing unit |
| 4 | current detector |
| 5 | three-phase to two-phase converter |
| 6 | angular velocity computing unit |
| 7 | current command generator |
| 8 | current controller |
| 9 | voltage converter |
| 10 | inverter |
| 11 | phase correction amount detector |
| 32 | adder |
| 12 | rotor |
| 12a | field winding |
| 13 | stator |
| 13a | stator winding |
| 14 | front bracket |
| 15 | rear bracket |
| 16 | rotational position detector |
| 16a | sensor stator |
| 16b | sensor rotor |
| 16c | hole |
| 16d | mounting ear |
| 17, 18 | bearing |
| 19 | rotational shaft |
| 20 | pulley |
| 21 | slip ring |
| 22 | brush |
| 22a | brush holder |

The invention claimed is:

1. An adjustment method of rotor position detection of a synchronous motor, wherein
   a synchronous motor having a stator wound around a stator coil and a rotor provided with magnetic poles, and
   a rotational position detector having a sensor rotor fixed to said rotor and a sensor stator disposed opposite to the sensor rotor for detecting a rotational position of said rotor are provided, and wherein
   an amount of deviation between said rotational position of said synchronous motor determined from an output of said rotational position detector and an actual rotational position of said synchronous motor is adjusted, said method comprising:
   a step of detecting said amount of deviation during rotation of said synchronous motor; and
   a step of mechanically adjusting a relative position between said rotational position detector and said synchronous motor based on a detected value of said amount of deviation,
   wherein said mechanical adjustment for adjusting the amount of deviation of said rotational position detector is performed while said synchronous motor is stopped.

2. An adjustment method of rotor position detection of a synchronous motor, wherein
   an amount of deviation between a rotational position of said synchronous motor determined from an output of a rotational position detector of said synchronous motor, on which vector control is performed, and an actual rotational position of said synchronous motor is adjusted, said method comprising:
   a step of making a d-axis current command and a q-axis current command zero regardless of a torque command based on a phase correction command for commanding adjustment for a rotational position deviation;
   a step of converting from three-phase current values of said synchronous motor to d-axis and q-axis currents;
   a step of determining a difference between said d-axis current command and said q-axis current command and said d-axis and q-axis currents;
   a step of determining a d-axis voltage command and a q-axis voltage command based on said difference;
   a step of estimating said amount of deviation based on said d-axis voltage command and said q-axis voltage command; and
   a step of adjusting a position of said rotational position detector based on said estimated amount of deviation by mechanically shifting in a rotational direction.

3. The adjustment method of rotor position detection of a synchronous motor according to claim 2, further comprising: a step of detecting the amount of deviation again after performing said step of adjusting the position of said rotational position detector by mechanically shifting in a rotational direction.

4. The adjustment method of rotor position detection of a synchronous motor according to claim 2, wherein said mechanical adjustment for adjusting the amount of deviation of said rotational position detector is performed while said synchronous motor is stopped.

5. The adjustment method of rotor position detection of a synchronous motor according to claim 2, wherein said mechanical adjustment for adjusting the amount of deviation of said rotational position detector is performed while said synchronous motor is rotating.

6. An adjustment method of rotor position detection of a synchronous motor, wherein
an amount of deviation between a rotational position of said synchronous motor determined from an output of a rotational position detector of said synchronous motor, on which vector control is performed, and an actual rotational position of said synchronous motor is adjusted, said method comprising:
a step of making a d-axis current command and a q-axis current command zero regardless of a torque command based on a phase correction command for commanding adjustment for a rotational position deviation;
a step of converting from three-phase current values of said synchronous motor to d-axis and q-axis currents;
a step of determining a difference between said d-axis current command and said q-axis current command and said d-axis and q-axis currents;
a step of determining a d-axis voltage command and a q-axis voltage command based on said difference;
a step of estimating said amount of deviation by determining the amount of offset in which said d-axis voltage command becomes zero; and
a step of adjusting a position of said rotational position detector based on said estimated amount of deviation by mechanically shifting in a rotational direction.

7. The adjustment method of rotor position detection of a synchronous motor according to claim 6, further comprising: a step of detecting the amount of deviation again after performing said step of adjusting the position of said rotational position detector by mechanically shifting in a rotational direction.

8. The adjustment method of rotor position detection of a synchronous motor according to claim 6, wherein said mechanical adjustment for adjusting the amount of deviation of said rotational position detector is performed while said synchronous motor is stopped.

9. The adjustment method of rotor position detection of a synchronous motor according to claim 6, wherein said mechanical adjustment for adjusting the amount of deviation of said rotational position detector is performed while said synchronous motor is rotating.

* * * * *